(12) United States Patent
Caprario et al.

(10) Patent No.: US 9,476,313 B2
(45) Date of Patent: Oct. 25, 2016

(54) GAS TURBINE ENGINE INCLUDING A PRE-DIFFUSER HEAT EXCHANGER

(71) Applicant: United Technologies Corporation, Hartford, CT (US)

(72) Inventors: Joseph T. Caprario, Cromwell, CT (US); Shawn J. Gregg, Wethersfield, CT (US); Dave J. Hyland, Portland, CT (US)

(73) Assignee: United Technologies Corporation, Hartford, CT (US)

( * ) Notice: Subject to any disclaimer, the term of this patent is extended or adjusted under 35 U.S.C. 154(b) by 694 days.

(21) Appl. No.: 13/724,320

(22) Filed: Dec. 21, 2012

(65) Prior Publication Data

US 2014/0178174 A1 Jun. 26, 2014

(51) Int. Cl.
*F01D 9/02* (2006.01)
*F01D 9/06* (2006.01)

(52) U.S. Cl.
CPC ..... *F01D 9/065* (2013.01); *F05D 2260/22141* (2013.01); *Y02T 50/676* (2013.01)

(58) Field of Classification Search
None
See application file for complete search history.

(56) References Cited

U.S. PATENT DOCUMENTS

| | | | | |
|---|---|---|---|---|
| 3,220,697 A | * | 11/1965 | Smuland | F01D 5/187 416/96 R |
| 3,332,238 A | | 7/1967 | Hemsworth | |
| 3,341,114 A | * | 9/1967 | Larson | F02C 7/047 244/134 R |
| 3,452,542 A | | 7/1969 | Saferstein et al. | |
| 4,137,705 A | | 2/1979 | Andersen et al. | |
| 4,416,111 A | * | 11/1983 | Lenahan | F02C 7/18 415/115 |
| 4,546,605 A | | 10/1985 | Mortimer et al. | |
| 4,761,947 A | * | 8/1988 | Hennecke | F02C 7/12 415/115 |
| 5,123,242 A | | 6/1992 | Miller | |
| 5,163,285 A | * | 11/1992 | Mazeaud | F01D 5/08 60/806 |
| 5,203,163 A | | 4/1993 | Parsons | |
| 5,231,825 A | * | 8/1993 | Baughman et al. | 60/204 |
| 5,269,133 A | * | 12/1993 | Wallace | F02C 7/185 165/142 |
| 5,297,386 A | * | 3/1994 | Kervistin | F01D 11/24 415/115 |
| 5,317,877 A | | 6/1994 | Stuart | |
| 5,438,823 A | | 8/1995 | Loxley et al. | |
| 5,632,141 A | * | 5/1997 | Sloop | F01D 17/105 60/751 |
| 5,685,158 A | | 11/1997 | Lenahan et al. | |

(Continued)

FOREIGN PATENT DOCUMENTS

| | | |
|---|---|---|
| EP | 0743435 | 11/1996 |
| EP | 1630358 | 3/2006 |

(Continued)

OTHER PUBLICATIONS

International Search Report for PCT Application No. PCT/US2013/075949 mailed Apr. 15, 2014.
International Preliminary Report on Patentability for PCT Application No. PCT/US2013/075949, mailed Jul. 2, 2015.
Supplementary European Search Report for Application No. 13863795.4 dated Jul. 5, 2016.

*Primary Examiner* — Ninh H Nguyen
*Assistant Examiner* — Justin Seabe
(74) *Attorney, Agent, or Firm* — Carlson, Gaskey & Olds, P.C.

(57) ABSTRACT

According to an example embodiment, a gas turbine engine assembly includes, among other things, a compressor. A strut near the compressor includes a flow passage through a portion of the strut. The flow passage is configured to direct air from the compressor to another portion of the gas turbine engine. The flow passage has at least one surface feature that at least partially hinders some airflow through the flow passage.

20 Claims, 4 Drawing Sheets

(56) References Cited

U.S. PATENT DOCUMENTS

| | | |
|---|---|---|
| 6,092,983 A | 7/2000 | Tomita et al. |
| 6,637,208 B2 | 10/2003 | Horner |
| 7,373,773 B2 | 5/2008 | Noda |
| 7,377,098 B2 * | 5/2008 | Walker et al. ............... 60/39.08 |
| 2003/0029158 A1 | 2/2003 | Horner |
| 2006/0042223 A1 | 3/2006 | Walker et al. |
| 2011/0020116 A1 | 1/2011 | Hashimoto et al. |
| 2011/0052373 A1 | 3/2011 | Sparks |
| 2011/0247344 A1 | 10/2011 | Glahn et al. |

FOREIGN PATENT DOCUMENTS

| | | |
|---|---|---|
| GB | 1244340 | 8/1971 |
| JP | 08210152 | 8/1996 |

* cited by examiner

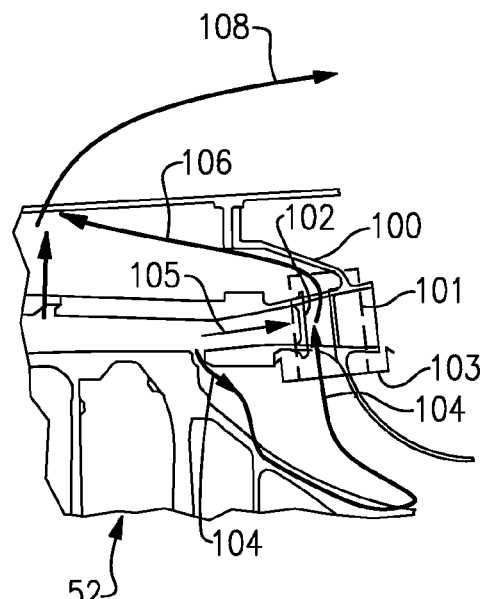
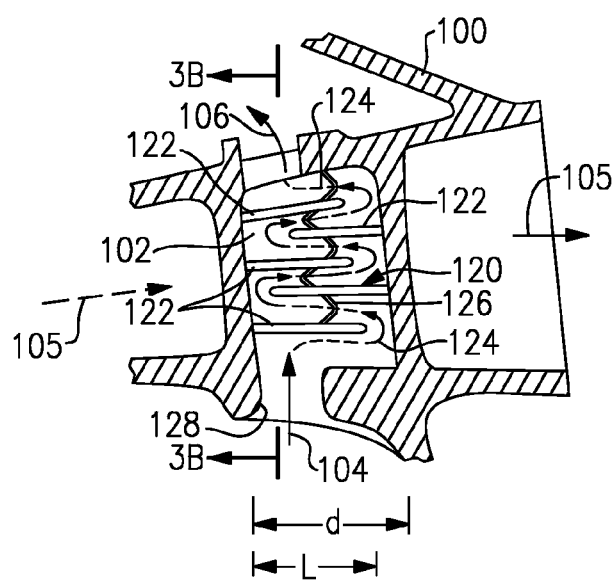
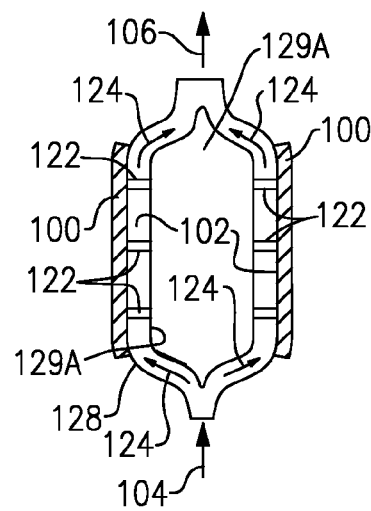

GAS TURBINE ENGINE INCLUDING A PRE-DIFFUSER HEAT EXCHANGER

BACKGROUND

A gas turbine engine typically includes a fan section, a compressor section, a combustor section and a turbine section. Air entering the compressor section is compressed and delivered into the combustor section where it is mixed with fuel and ignited to generate a high-speed exhaust gas flow. The high-speed exhaust gas flow expands through the turbine section to drive the compressor and the fan section. The compressor section typically includes low and high pressure compressors, and the turbine section includes low and high pressure turbines.

There are various aspects of gas turbine operation that require or would benefit from temperature control. For example, it is useful to provide cooling air to the turbine section. Providing sufficiently cool air to the turbine section tends to increase the lifetime of the turbine hardware.

SUMMARY

According to an example embodiment, a gas turbine engine assembly includes, among other things, a compressor. A strut near the compressor includes a flow passage through a portion of the strut. The flow passage is configured to direct air from the compressor to another portion of the gas turbine engine. The flow passage has at least one surface feature that at least partially augments heat transfer within the flow passage.

In a further non-limiting embodiment according to the foregoing gas turbine engine assembly, the surface feature comprises a rough surface within the flow passage.

In a further non-limiting embodiment according to any of the foregoing gas turbine engines assemblies, the surface feature comprises a baffle within the flow passage.

In a further non-limiting embodiment according to any of the foregoing gas turbine engine assemblies, the flow passage has a cross-sectional dimension in a direction that is transverse to a primary direction of airflow through the flow path. The baffle comprises a plurality of walls within the flow passage. Each of the walls has a length oriented transverse to the primary direction of airflow. The length of each wall is less than the cross-sectional dimension.

In a further non-limiting embodiment according to any of the foregoing gas turbine engine assemblies, the baffle comprises the plurality of pegs situated in the flow passage. Each of the pegs has a length along a direction that is transverse to a direction of airflow through the flow passage.

In a further non-limiting embodiment according to any of the foregoing gas turbine engine assemblies, the baffle comprises an insert that is situated within a portion of the strut that includes the flow passage.

In a further non-limiting embodiment according to any of the foregoing gas turbine engine assemblies, the baffle establishes a tortuous path for airflow through the flow passage.

In a further non-limiting embodiment according to any of the foregoing gas turbine engine assemblies, the surface feature provides an increased surface area for contacting at least some airflow through the flow passage.

In a further non-limiting embodiment according to any of the foregoing gas turbine engine assemblies, the strut is operative as a heat exchanger such that at least some air entering the flow passage has a higher temperature than at least some air exiting the flow passage.

According to another example embodiment, a gas turbine engine assembly includes, among other things, a compressor. A strut near the compressor includes a flow passage through a portion of the strut. The flow passage is configured to direct air from the compressor to another portion of the gas turbine engine. The flow passage has at least one surface feature that provides an increased surface area for contacting at least some airflow through the flow passage.

In a further non-limiting embodiment according to the foregoing gas turbine engine assembly, the surface feature comprises a rough surface within the flow passage.

In a further non-limiting embodiment according to any of the foregoing gas turbine engine assemblies, the surface feature comprises a baffle within the flow passage.

In a further non-limiting embodiment according to any of the foregoing gas turbine engine assemblies, the flow passage has a cross-sectional dimension in a direction that is transverse to a primary direction of airflow through the flow path. The baffle comprises a plurality of walls within the flow passage. Each of the walls has a length oriented transverse to the primary direction of airflow. The length of each wall is less than the cross-sectional dimension.

In a further non-limiting embodiment according to any of the foregoing gas turbine engine assemblies, the baffle comprises a plurality of pegs situated in the flow passage. Each of the pegs has a length along a direction that is transverse to a direction of airflow through the flow passage.

In a further non-limiting embodiment according to any of the foregoing gas turbine engine assemblies, the baffle comprises an insert that is situated within a portion of the strut that includes the flow passage.

In a further non-limiting embodiment according to any of the foregoing gas turbine engine assemblies, the baffle establishes a tortuous path for airflow through the flow passage.

In a further non-limiting embodiment according to any of the foregoing gas turbine engine assemblies, the surface feature at least partially augments heat transfer within the flow passage.

In a further non-limiting embodiment according to any of the foregoing gas turbine engine assemblies, the strut is operative as a heat exchanger such that at least some air entering the flow passage has a higher temperature than at least some air exiting the flow passage.

According to an embodiment, a method of operating a gas turbine engine includes, among other things, directing airflow from a compressor into a flow passage through a strut near the compressor. A temperature of the airflow in the flow passage is at least partially reduced. Air from the flow passage is directed toward a turbine portion of the gas turbine engine.

In a further non-limiting embodiment according to the foregoing method, the temperature of the airflow in the flow passage is at least partially reduced by using the strut as a heat exchanger for at least partially cooling the airflow.

The various features and advantages of at least one disclosed embodiment will become apparent to those skilled in the art from the following detailed description. The drawings that accompany the detailed description can be briefly described as follows.

BRIEF DESCRIPTION OF THE DRAWINGS

FIG. 2 illustrates selected portions of the example of FIG. 1 and schematically illustrates airflow associated with the illustrated portions.

FIGS. 3A and 3B are cross-sectional illustrations of an example airflow passage through a strut designed according to an embodiment of this invention.

DETAILED DESCRIPTION

Figure 1:
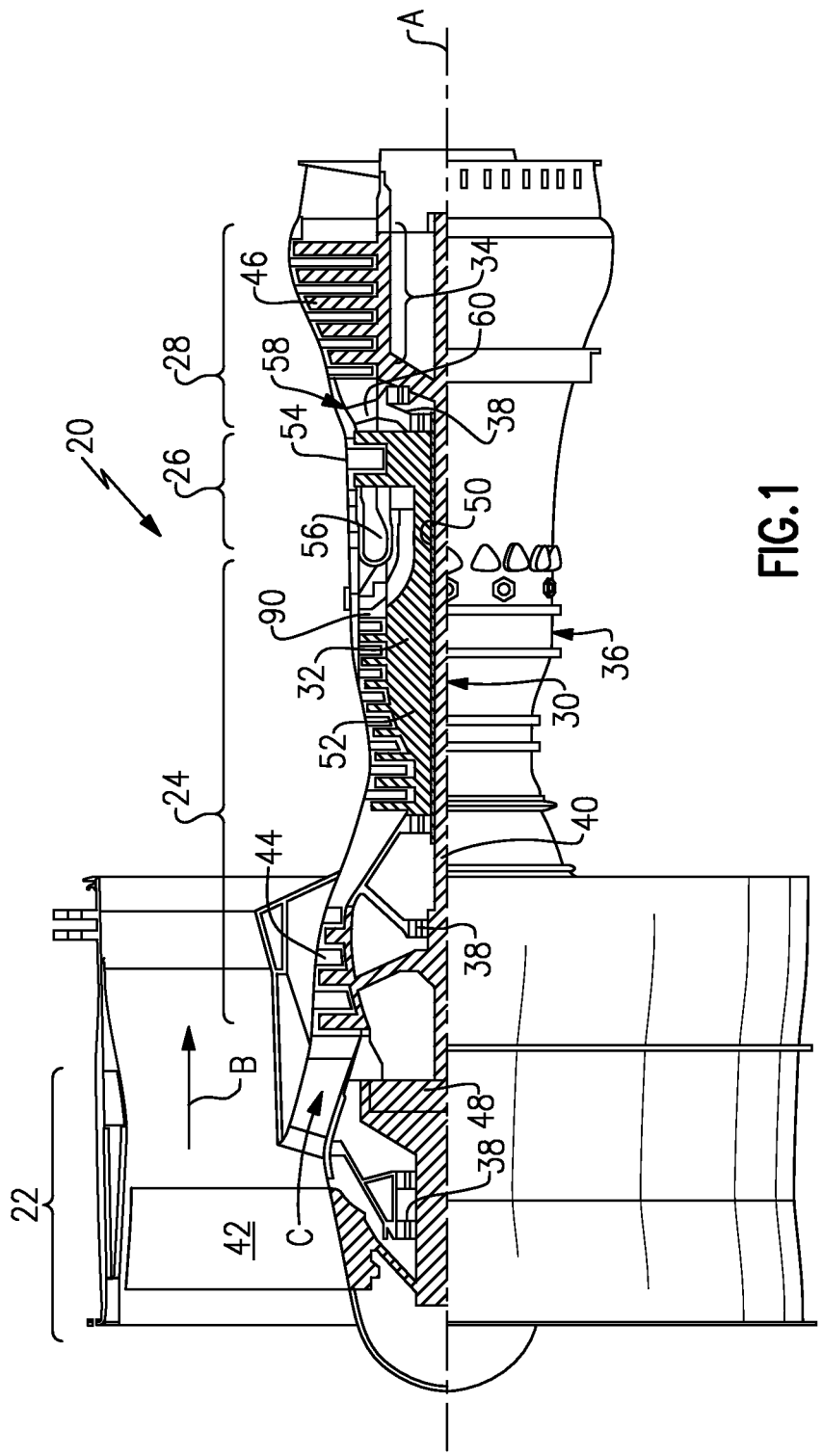
FIG. 1 schematically shows an example embodiment of a gas turbine engine assembly.

FIG. 1 schematically illustrates an example gas turbine engine 20 that includes a fan section 22, a compressor section 24, a combustor section 26 and a turbine section 28. Alternative engines might include an augmenter section (not shown) among other systems or features. The fan section 22 drives air along a bypass flow path B while the compressor section 24 draws air in along a core flow path C where air is compressed and communicated to a combustor section 26. In the combustor section 26, air is mixed with fuel and ignited to generate a high pressure exhaust gas stream that expands through the turbine section 28 where energy is extracted and utilized to drive the fan section 22 and the compressor section 24.

Although the disclosed non-limiting embodiment depicts a turbofan gas turbine engine, it should be understood that the concepts described herein are not limited to use with turbofans as the teachings may be applied to other types of turbine engines; for example a turbine engine including a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section.

The example engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that connects a fan 42 and a low pressure (or first) compressor section 44 to a low pressure (or first) turbine section 46. The inner shaft 40 drives the fan 42 through a speed change device, such as a geared architecture 48, to drive the fan 42 at a lower speed than the low speed spool 30. The high-speed spool 32 includes an outer shaft 50 that interconnects a high pressure (or second) compressor section 52 and a high pressure (or second) turbine section 54. The inner shaft 40 and the outer shaft 50 are concentric and rotate via the bearing systems 38 about the engine central longitudinal axis X.

A combustor 56 is arranged between the high pressure compressor 52 and the high pressure turbine 54. In one example, the high pressure turbine 54 includes at least two stages to provide a double stage high pressure turbine 54. In another example, the high pressure turbine 54 includes only a single stage. As used herein, a "high pressure" compressor or turbine experiences a higher pressure than a corresponding "low pressure" compressor or turbine.

The example low pressure turbine 46 has a pressure ratio that is greater than about five (5). The pressure ratio of the example low pressure turbine 46 is measured prior to an inlet of the low pressure turbine 46 as related to the pressure measured at the outlet of the low pressure turbine 46 prior to an exhaust nozzle.

A mid-turbine frame 58 of the engine static structure 36 is arranged generally between the high pressure turbine 54 and the low pressure turbine 46. The mid-turbine frame 58 further supports bearing systems 38 in the turbine section 28 as well as setting airflow entering the low pressure turbine 46.

The core airflow C is compressed by the low pressure compressor 44 then by the high pressure compressor 52 mixed with fuel and ignited in the combustor 56 to produce high speed exhaust gases that are then expanded through the high pressure turbine 54 and low pressure turbine 46. The mid-turbine frame 58 includes vanes 59, which are in the core airflow path and function as an inlet guide vane for the low pressure turbine 46. Utilizing the vane 59 of the mid-turbine frame 58 as the inlet guide vane for low pressure turbine 46 decreases the length of the low pressure turbine 46 without increasing the axial length of the mid-turbine frame 58. Reducing or eliminating the number of vanes in the low pressure turbine 46 shortens the axial length of the turbine section 28. Thus, the compactness of the gas turbine engine 20 is increased and a higher power density may be achieved.

The disclosed gas turbine engine 20 in one example is a high-bypass geared aircraft engine. In a further example, the gas turbine engine 20 includes a bypass ratio greater than about six (6), with an example embodiment being greater than about ten (10). The example geared architecture 48 is an epicyclical gear train, such as a planetary gear system, star gear system or other known gear system, with a gear reduction ratio of greater than about 2.3.

In one disclosed embodiment, the gas turbine engine 20 includes a bypass ratio greater than about ten (10:1) and the fan diameter is significantly larger than an outer diameter of the low pressure compressor 44. It should be understood, however, that the above parameters are only exemplary of one embodiment of a gas turbine engine including a geared architecture and that the present disclosure is applicable to other gas turbine engines.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft., with the engine at its best fuel consumption—also known as "bucket cruise Thrust Specific Fuel Consumption ('TSFC')"—is the industry standard parameter of pound-mass (lbm) of fuel per hour being burned divided by pound-force (lbf) of thrust the engine produces at that minimum point.

"Low fan pressure ratio" is the pressure ratio across the fan blade alone, without a Fan Exit Guide Vane ("FEGV") system. The low fan pressure ratio as disclosed herein according to one non-limiting embodiment is less than about 1.50. In another non-limiting embodiment the low fan pressure ratio is less than about 1.45.

"Low corrected fan tip speed" is the actual fan tip speed in ft/sec divided by an industry standard temperature correction of $[(\text{Tram } ° \text{R})/(518.7° \text{R})]^{0.5}$. The "Low corrected fan tip speed", as disclosed herein according to one non-limiting embodiment, is less than about 1150 ft/second.

The example gas turbine engine includes the fan 42 that comprises in one non-limiting embodiment less than about twenty-six (26) fan blades. In another non-limiting embodiment, the fan section 22 includes less than about twenty (20) fan blades. Moreover, in one disclosed embodiment the low pressure turbine 46 includes no more than about six (6) turbine rotors schematically indicated at 34. In another non-limiting example embodiment the low pressure turbine 46 includes about three (3) turbine rotors. A ratio between the number of fan blades and the number of low pressure turbine rotors is between about 3.3 and about 8.6. The example low pressure turbine 46 provides the driving power to rotate the fan 22 and therefore the relationship between the number of turbine rotors 34 in the low pressure turbine 46 and the number of blades in the fan 22 disclose an example gas turbine engine 20 with increased power transfer efficiency.

FIG. 2 illustrates selected portions of the high pressure compressor 52 of the example embodiment from FIG. 1. A strut 100 is situated near the high pressure compressor 52. In the illustration of FIG. 2, the strut 100 is surrounded by a dashed line 101. In the illustrated example, the strut 100 comprises a pre-diffuser strut and is positioned in the primary flowpath C at element 90 (illustrated in FIG. 1). The strut 100 includes an airflow passage 102 for cooling air that is eventually directed toward the high pressure turbine 54. As shown in FIG. 2, some airflow 104 is bled from the high pressure compressor 52 and enters the airflow passage 102. Before exiting the airflow passage 102 as schematically shown at 106, a temperature of the air is at least partially reduced. The strut 100 operates as a heat exchanger for at least partially altering the temperature of airflow through the airflow passage 102.

In some examples the airflow at 104 is hotter than the airflow at 105. In those cases, the airflow at 105 can absorb heat from and cool the airflow at 104. In some other examples, the airflow at 104 is cooler than the airflow at 105. In those situations the airflow at 104 absorbs some heat from the airflow at 105. In those cases the airflow at 106 is warmer than the airflow at 104.

The airflow 106 is directed toward and eventually mixes with airflow schematically shown at 108 that is directed to the high pressure turbine 54. Reducing the temperature of the air passing through the airflow passage 102 enhances the amount of cooling air provided to the components of the high pressure turbine 54 such as the second vane and the turbine rotor cover plates.

FIGS. 3A and 3B are cross-sectional illustrations drawn along the plane defined by the dashed lines 108, beginning at sectional line 103 and extending radially outward. The cross-sectional illustrations of FIGS. 3A and 3B show an example configuration of an example airflow passage 102. At least one surface feature 120 within the airflow passage 102 augments heat transfer within the airflow passage 102. In this example, the surface feature augments heat transfer because it at least partially hinders at least some of the airflow through the passage 102, which increases the amount of contact between the air and the airflow passage 102. In this example, the surface feature 120 comprises a baffle. The example baffle includes a plurality of vanes or wall segments 122 that are situated to establish a tortuous path that the airflow must follow as it passes through the airflow passage 102. In FIG. 3A, the airflow schematically shown at 124 follows a tortuous path as illustrated.

In the example of FIG. 3A, the airflow passage 102 includes a cross-sectional dimension d. Each of the vanes 122 has a length L extending in a direction that is transverse to a primary direction of airflow through the airflow passage 102. The primary direction of the airflow is schematically shown by the arrows 104 and 106. The length L is less than the cross-sectional dimension d and the vanes 122 are situated as illustrated to establish the tortuous path for airflow shown at 124.

As shown in FIG. 3A, this example also includes ribs or ridges 126 along the tortuous path that air follows as it passes through the flow passage 102. Some examples include ridges formed as turbulentors or trip strips. The ribs or ridges 126 along with the vanes 122 increase an amount of surface area within the airflow passage 102 for contacting at least some of the air 104 before it exits at 106. Increasing the amount of surface contact between the material of the airflow passage 102 and the air flowing through it enhances the ability of the strut 100 to operate as a heat exchanger.

FIG. 3B shows the airflow passage 102 as seen along the lines 3B-3B in FIG. 3A. The airflow passage 102 in the example is established by an insert 128 that is situated within the strut 100. This configuration allows for the airflow 104 to pass through the airflow passage 102 in a direction from bottom to top (according to the drawing) and to allow other air schematically shown at 105 (FIG. 3A) to flow from the compressor 52 toward the combustor 56. The inset 128 includes a central opening or through passage 129A (FIG. 3B) to accommodate the airflow schematically shown at 105.

Figure 4:
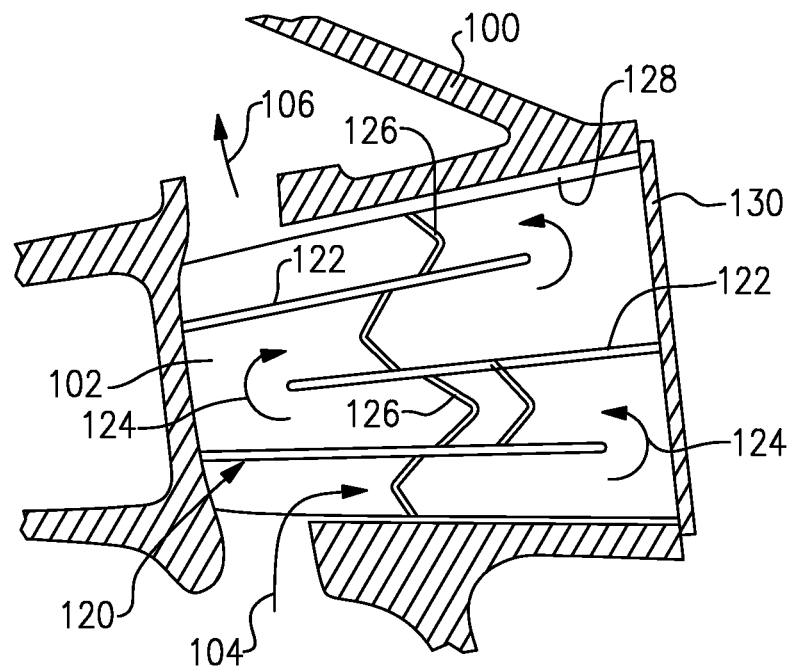
FIG. 4 is a cross-sectional illustration of another example airflow passage configuration.

FIG. 4 illustrates another example arrangement. The example of FIG. 4 includes a surface feature 120 that is configured as a baffle within the airflow passage 102. In this example, the airflow passage 102 extends to an end of the strut 100. This example also includes an insert 128 that is situated within the strut 100. A cover plate 130 establishes one edge of the insert 128 near an end of the strut 100 for establishing the airflow passage 102 as schematically shown. Depending on the configuration of the strut 100 and the desired amount of airflow through the passage 102, an arrangement as shown in FIG. 3 or 4 may be selected to meet the needs of a particular situation.

Figure 5:
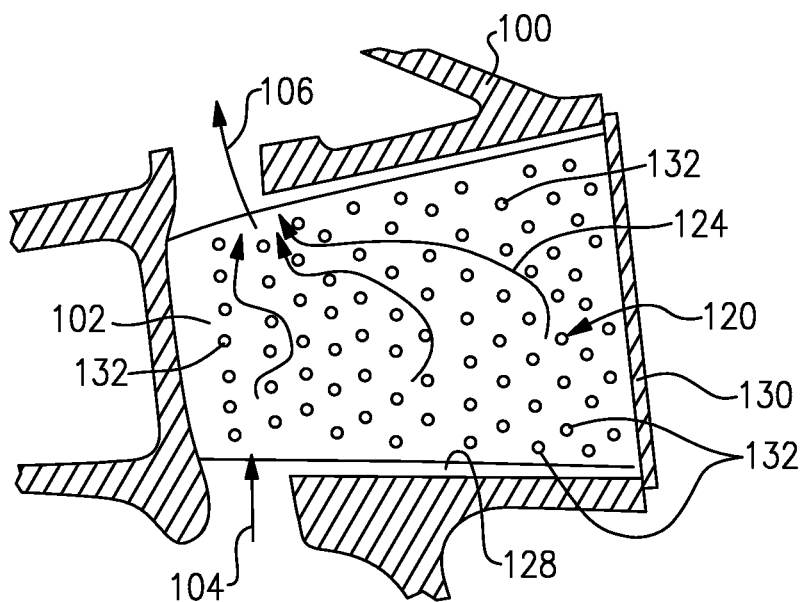
FIG. 5 is a cross-sectional illustration of another example airflow passage configuration.

FIG. 5 illustrates another example arrangement. In this example, the surface feature 120 comprises a baffle established by a plurality of posts 132 situated within the airflow passage 102. The posts 102 interrupt or at least partially hinder airflow through the passage 102 resulting in air flowing in directions schematically shown at 124. Another feature of the posts 132 is that they increase the amount of surface area contact between the air flowing through the passage 102 and the material of the passage 102. Increased surface area contact increases the heat exchange capability of the strut 100 for cooling the air 104 before it exists at 106.

Figure 6:
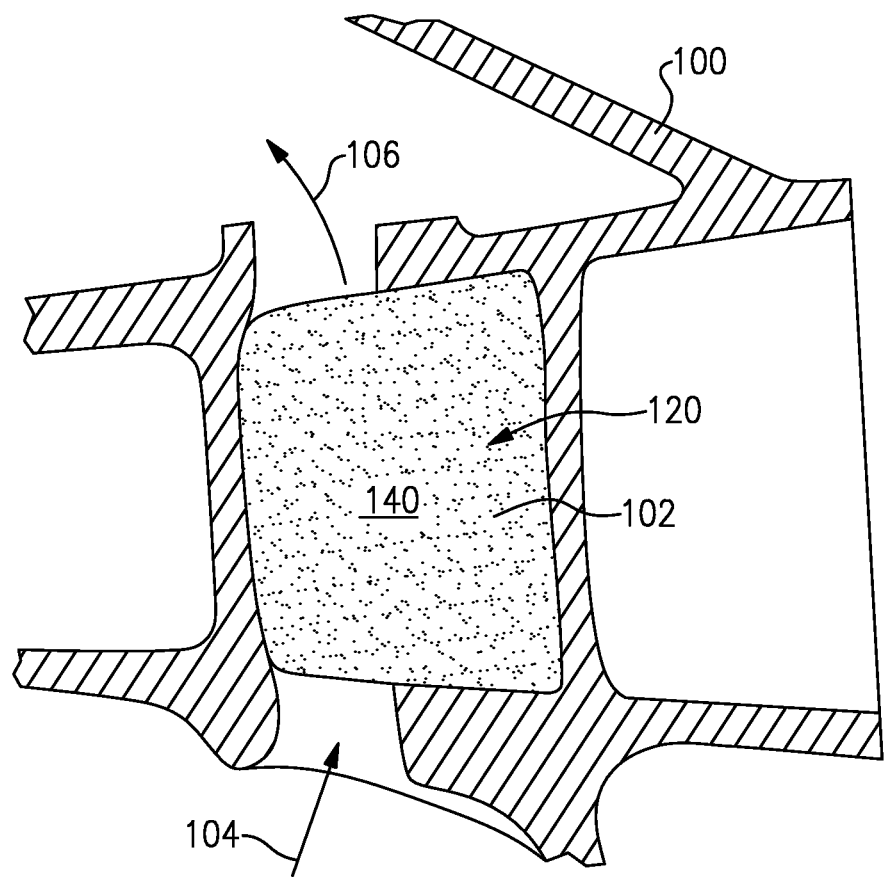
FIG. 6 is a cross-sectional illustration of another example airflow passage configuration.

FIG. 6 illustrates another example arrangement. In this example, the surface feature 120 includes a rough surface 140 established on at least one of the sides within the airflow passage 102. The rough surface 140 may have a variety of configurations such as a selected pattern or a random arrangement of surface imperfections or variations in thickness, for example. The rough surface 140 provides an increased amount of surface area for contact with the airflow through the passage 102.

Each of the illustrated examples cool the relatively hot air schematically shown at 104 exiting from the compressor 52. The strut 100 operates as a heat exchanger. The cooled air schematically shown at 106 has a lower temperature than the air schematically shown at 104. Therefore, a lower temperature air mixture is established at 108 (FIG. 2). Increasing the heat exchanging capability of the strut 100 leads to cooler turbine cooling air temperatures. The illustrated examples decrease cooling air needs and increase the lifetime of components in the high pressure turbine 54.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

We claim:

1. A gas turbine engine assembly, comprising:
   a compressor (52);
   a combustor fluidly connected to the compressor via a primary flowpath; and
   a strut (100) downstream of the compressor and upstream of the combustor, the strut spans from an inner wall of the primary flowpath to an outer wall of the primary flowpath in a radial direction, and the strut including a flow passage (102) through a portion of the strut, the flow passage being configured to direct air (104) from the compressor to another portion (54) of the gas turbine engine, the flow passage having at least one surface feature (120) that at least partially augments heat transfer within the flow passage, and wherein the strut (100) is operative as a heat exchanger such that at least some air entering the flow passage has a higher temperature than at least some air exiting the flow passage.

2. The assembly of claim 1, wherein the at least one surface feature (120) comprises a rough surface (140) within the flow passage.

3. The assembly of claim 1, wherein the at least one surface feature (120) comprises a baffle within the flow passage.

4. The assembly of claim 3, wherein
   the flow passage has a cross-sectional dimension (d) in a direction that is transverse to a primary direction of airflow through the flow passage;
   the baffle comprises a plurality of walls (122) within the flow passage;
   each of the walls has a length (L) oriented transverse to the primary direction (104, 106) of airflow; and
   the length (L) is less than the cross-sectional dimension (d).

5. The assembly of claim 3, wherein
   the baffle comprises a plurality of posts (132) situated in the flow passage; and
   each of the posts has a length oriented transverse to a direction of airflow through the flow passage.

6. The assembly of claim 3, wherein the baffle comprises an insert (128) that is situated within a portion of the strut that includes the flow passage.

7. The assembly of claim 3, wherein the baffle establishes a tortuous path (124) for airflow through the flow passage.

8. The assembly of claim 1, wherein the at least one surface feature provides an increased surface area for contacting at least some airflow through the flow passage.

9. The assembly of claim 1, wherein said another portion of the gas turbine engine comprises a high pressure turbine.

10. The assembly of claim 1, wherein the strut comprises a pre-diffuser strut.

11. The assembly of claim 1, wherein the strut is configured to structurally support said primary flowpath.

12. A pre-diffuser assembly, comprising:
    a strut (100) configured to span from an inner wall of a primary flowpath of a gas turbine engine to an outer wall of the primary flowpath in a radial direction of the gas turbine engine, and the strut including a flow passage (102) through a portion of the strut, the flow passage being configured to direct air from a compressor (52) to another portion (54) of the gas turbine engine, the strut configured in a position downstream of the compressor and upstream of a combustor of the gas turbine engine, the flow passage having at least one surface feature (120) that provides an increased surface area for contacting at least some airflow through the flow passage, wherein the strut (100) is operative as a heat exchanger such that at least some air entering the flow passage has a higher temperature than at least some air exiting the flow passage.

13. The assembly of claim 12, wherein the at least one surface feature comprises a rough surface (140) within the flow passage.

14. The assembly of claim 12, wherein the at least one surface feature (120) comprises a baffle within the flow passage.

15. The assembly of claim 14, wherein
    the flow passage has a cross-sectional dimension (d) in a direction that is transverse to a primary direction of airflow through the flow passage;
    the baffle comprises a plurality of walls (122) within the flow passage;
    each of the walls has a length (L) oriented transverse to the primary direction (104, 106) of airflow; and
    the length (L) is less than the cross-sectional dimension (d).

16. The assembly of claim 14, wherein
    the baffle comprises a plurality of posts (132) situated in the flow passage; and
    each of the posts has a length along a direction that is transverse to a direction of airflow through the flow passage.

17. The assembly of claim 14, wherein the baffle comprises an insert (128) that is situated within a portion of the strut (100) that includes the flow passage.

18. The assembly of claim 14, wherein the baffle establishes a tortuous path (124) for airflow through the flow passage.

19. The assembly of claim 14, wherein the at least one surface feature at least partially augments heat transfer within the flow passage.

20. The assembly of claim 12, wherein said another portion of the gas turbine engine comprises a high pressure turbine.

* * * * *